Patented Nov. 27, 1945

2,389,865

UNITED STATES PATENT OFFICE 2,389,865

ARTIFICIAL RESIN AND METHOD OF PREPARATION

Gordon F. Mills, Palo Alto, and Alexander V. Alm, Burlingame, Calif., assignors to Chemical Process Company, San Francisco, Calif., a corporation of Nevada No Drawing. Application December 23, 1942, Serial No. 469,939

7 Claims. (Cl. 260—57)

Our invention relates to resins, and more particularly to resinous condensation products of the phenol-formaldehyde type.

It is well known that resins of the phenol-formaldehyde type may be produced by condensation reaction in an aqueous or alcoholic vehicle of a phenolic body and formaldehyde by the application of heat in the presence of an alkali metal alkali which serves as a basic catalytic condensing agent. Such resins may be formed with widely varying proportions of the phenolic body, formaldehyde, and liquid reaction medium or vehicle. However, in their final state, the known resins of this reaction are of relatively high density, and are either substantially dry, non-porous, solid homogeneous bodies, or cellular bodies having water in the dispersed phase colloidally distributed throughout the cells thereof. A resin of the latter type is disclosed in the patent to Pollak et al. No. 1,854,600, dated April 19, 1932, and in the reissue of such patent. Because the water is in the dispersed phase in the resin of the patent, it cannot be driven off by heat from the final product without softening or otherwise altering the physical characteristics of the resin. Thus, a resin cannot be obtained which is of the character of that of our invention, namely, one having a structure wherein the resin has sub-micro pores uniformly distributed throughout the mass in contradistinction to a cellular resin structure such as may be obtained by whipping air into a liquid resin and setting the resin to a solid before the air can escape. In the latter case, there will be relatively large masses of the resin which will have no pores therein.

We have found that with respect to such reactions of the phenol-formaldehyde type in an aqueous or alcoholic reaction vehicle in the presence of a basic catalyst which serves as a condensing agent, a resin can be formed in which the liquid reaction medium is substantially in the continuous phase throughout the resin gel before such gel is dried, provided the quantity of catalyst is adjusted or controlled within varying limits for given proportions of the phenolic body, formaldehyde and liquid reaction medium, and for given conditions of temperature and pressure under which the reaction is conducted. As a result, the liquid reaction vehicle, which will usually be water, can be driven off upon drying of the gel to produce the final resin product; and such dry resin will be a relatively light weight, porous and non-transparent or opaque solid body, the density or specific gravity thereof varying from about four-tenths (0.4) to about six-tenths (0.6). Furthermore, drying of the resin gel to the final dry resin product, will not result in shrinkage of the resin; so that the dry resin product will occupy substantially the volume of the precipitated gel prior to drying thereof.

The proper quantity of basic catalyst or condensing agent which should be employed to produce the porous resin of our invention can be determined as follows: For given proportions of the reacting substances and the liquid reaction vehicle, too great a quantity of basic catalyst will cause the resin gel, which will form upon application of heat, to set to a solid, transparent or translucent, dark, amber or red colored mass which will shrink upon drying, which is unsatisfactory for production of the product of our invention. If the quantity of such basic catalyst or condensing agent is too little, then the reaction vehicle separates in a layer from the major portion of the other reaction materials; which also will not provide the product of our invention. The quantity of basic condensing agent should thus be at least sufficient to maintain the reaction products in solution up to or about the point at which gel formation occurs, but insufficient or not sufficiently great to cause the gel to assume the transparent or translucent dark, amber or reddish color previously described. With the proper quantity of basic condensing agent or catalyst, the resultant gel will be light colored or whitish in appearance, and also opaque, cloudy, or non-transparent or non-translucent. In such gel, the liquid reaction vehicle will be in the continuous phase, as was previously mentioned; and upon drying of such mass, the previously described porous final product will be produced without substantial shrinkage of the gel during the drying, the pores in the final product being minute and connected to or extending to the surface. As a result, our final product and broken granules thereof offer a much greater contact surface to fluids than the outside dimensions of the product or of the broken granules thereof would indicate, much of this available surface being on the inside.

In such type of reaction between the phenolic body and the formaldehyde, enough of the basic condensing agent should be employed to maintain the reaction products in solution up to the desired point of gel formation of such products. However, should the reaction be conducted in a vehicle which contains some alcohol or other water miscible solvent which serves as a solubilizer for the phenolic body and the formaldehyde, then the amount of basic condensing agent may be reduced an amount equivalent to the solubilizing effect of the solvent. Also, for any given quantities of phenolic body and formaldehyde, the quantity of basic condensing agent should generally be increased with increase in the quantity of liquid which may be employed in the reaction vehicle. This is necessary to suppress hydrolysis of the alkali phenolate but as was previously related, the quantity of basic condensing agent required to produce the resin of our invention may be readily determined for any given proportions of the other substances entering the reaction, and of the reaction vehicle, and for any given conditions under which the reaction is conducted, by the empirical method of observation previously related.

As the preferred phenolic body, we preferably employ the compound phenol but any of the other phenolic bodies or phenols generally employed in the described type of reaction may be utilized, such as any mono-hydroxy substituted benzene compound which has the two ortho, and one para position open, for example, metal cresol, or symmetrical xylenol. We preferably employ formaldehyde for reaction with the phenolic body. However, other carbonyl compounds may be employed instead of the formaldehyde, such as paraformaldehyde which may replace it entirely and which is hereinafter generically designated by "formaldehyde." Also some of the formaldehyde may be replaced by materials such as hexamethylene tetramine, acetaldehyde, or acetone. Preferably, the proportion of the phenolic body with respect to the formaldehyde should be about one (1.0) mole of the former to about two and one-half (2.5) moles of the latter. However, the variations in such proportions may be as low as one (1.0) mole of the phenolic body to about one and one-quarter (1.25) moles of the formaldehyde, and as high as one (1.0) mole of the phenolic body to about four (4) moles of the formaldehyde.

As the basic catalyst or condensing agent, we preferably employ alkali metal alkalies, such as sodium hydroxide or potassium hydroxide, since we have found that these substances are more satisfactory in performing the function of maintaining the proper degree of solubility of the resin molecules. Other alkali metal alkalies, such as sodium or potassium carbonate may be also employed, but other alkali metal salts, such as sodium aluminate, are less satisfactory. In this connection, when alkali metal carbonates are employed, we have found that two separate ranges of alkali concentrations will produce the desired gel of our invention. These ranges may be readily identified in the manner already described. The quantity of water in the reaction vehicle, which may also contain alcohol, is relatively immaterial within reasonably wide limits, but should not be too great because then the desired type of gel may not be formed; and as was previously related, the quantity of condensing agent should be adjusted or controlled in accordance with the quantity of reaction liquid, as well as the quantities of phenolic body and formaldehyde, to produce the type of product at which our invention aims.

Generally, the reaction is effected by refluxing the materials at a preferred temperature of between ninety degrees centigrade (90° C.) and one hundred degrees centigrade (100° C.) until gel formation occurs which may take anywhere from about one and one-half (1½) to six (6) hours. After initial formation of the gel, the heating is preferably continued under refluxing for about one (1) hour to improve the structure and strength of the gel; and then the reaction is preferably completed under pressure in a closed chamber or bomb, at a temperature of between one hundred and ten degrees centigrade (110° C.) and one hundred and fifty degrees centigrade (150° C.). Heating under pressure in a bomb not only expedities completion of the reaction, but also precludes escape of moisture from the gel during the final phases of the reaction to thus maintain the porous structure of the gel. After the reaction is completed, the resultant resin is generally dried in any suitable manner, preferably by application of heat, to drive off water and provide the desired final porous product.

The described temperatures and times in conducting the process are not critical, as lower temperatures may be employed, but then the reaction will take longer to complete. If so desired, the reaction may be both initiated and conducted to conclusion in a bomb. Also, a higher temperature may be employed to initially heat the materials to effect the reaction, thus further expediting the reaction, but care must be taken that the temperature is not too high because this might result in too violent a reaction, which may cause the resultant gel to have a structure full of relatively large gas holes.

The following are typical examples of resins prepared in accordance with the teachings of our invention:

I

One (1) mole of phenol and two and forty-five hundredths (2.45) moles of formaldehyde (185 c. c. of commercial formaldehyde solution which is usually an aqueous solution containing thirty-seven per cent (37%) of formaldehyde by weight) were mixed together; and two (2) grams of sodium hydroxide dissolved in sixty-eight (68) c. c. of water were added to the mixture. The resultant mixture was then heated in a glass vessel under reflux at a temperature of ninety-four degrees centigrade (94° C.). After two (2) hours of heating, the resin set to a white opaque gel; and in this form it was heated one hour longer at the same temperature to improve its structure and strength. A small amount of liquid synerized from the gel which was removed by light washing with water. The gel was then placed in a bomb and heated at one hundred and twenty degrees centigrade (120° C.) for one hour to complete the resin condensation. Substantially no shrinkage occurred in the resin after formation of the gel; and the final product after drying by subjection to heated air, at a temperature of forty-five degrees centigrade (45° C.), was a whitish, solid, light, porous body.

II

One (1) mole of phenol and one and twenty-five hundredths (1.25) moles of formaldehyde (94 c. c. of the previously described commercial formaldehyde solution) were mixed together; and four and two-tenths (4.2) grams of sodium hydroxide dissolved in one hundred and fifty-nine (159) c. c. of water were added to the mixture. The resultant mixture was heated as in Example I; and it set to a white opaque gel after five and one-half (5½) hours. This gel was heat treated in a bomb, also as in Example I; and the resultant resin after air drying, as in Example I, was equally light and porous, but was somewhat more colored.

III

One (1) mole of phenol and two and forty-five one hundredths (2.45) moles of formaldehyde (185 c. c. of the commercial formaldehyde solution) were mixed; and two and sixty-five one hundredths (2.65) grams of sodium hydroxide dissolved in two hundred and five (205) c. c. of water were added to the mixture. After heating of the resultant mixture as in Example I, for two (2) hours, it set to a white opaque gel. This gel, when heated in a bomb and air dried as in Example I, was a very low density porous solid.

IV

One (1) mole of commercial or technical meta-cresol and two and forty-five one hundredths moles of formaldehyde (185 c. c. of the commercial formaldehyde solution) were mixed; and three and seven-tenths (3.7) grams of sodium hydroxide dissolved in one hundred and thirty-seven (137) c. c. of water were added to the mixture. The resultant mixture was first gently heated in a glass vessel under reflux until the initial violent reaction had subsided; whereupon the heating was continued at a temperature of about ninety degrees centigrade (90° C.). In about one hour, the mixture set to a greenish white opaque gel. Heating in the reflux was then continued for one hour, at a temperature of ninety-four degrees centigrade (94° C.); after which the gel was heat treated in a bomb at one hundred and fifty degrees centigrade (150° C.) for one hour. After drying in the manner already described, the resultant resin was a light, solid porous body.

V

Eight-ninths (8/9) of a mole of phenol, one-ninth (1/9) of a mole of ortho cresol, and two and forty-five one hundredths (2.45) moles of formaldehyde (185 c. c. of the commercial formaldehyde solution) were mixed; and to such mixture was added a solution of three and eight-tenths (3.8) grams of sodium hydroxide in one hundred and thirty-seven (137) c. c. of water. This mixture was heated in a glass vessel under reflux, at ninety-two degrees centigrade (92° C.); and after about three hours the mass set to a white opaque gel. Heating was continued for one hour at the same temperature; and then the product was heated for one hour in a bomb at a temperature of one hundred and thirty degrees centigrade (130° C.). This product was a solid and hard white resin which upon mere standing in the air dried to a light porous mass.

VI

One (1) mole of phenol, fourteen and six-tenths (14.6) grams of acetone, and two and twenty-five one hundredths (2.25) moles of formaldehyde (167 c. c. of the commercial formaldehyde solution) were mixed; and two (2) grams of sodium hydroxide dissolved in sixty-eight (68) c. c. of water were added to the mixture. The resultant mixture was heated in a glass vessel under reflux at ninety-four degrees centigrade (94° C.); and after two hours, the mixture set to a white opaque gel, which was heated for one more hour at the same temperature, and then given the heat and pressure treatment in a bomb, for two (2) hours, at a temperature of one hundred and ten degrees centigrade (110° C.). The resultant product after drying, was also light and porous.

VII

One-third (1/3) of a mole of phenol, two-thirds (2/3) of a mole of urea, and two and forty-five hundredths (2.45) moles of formaldehyde (185 c. c. of the commercial formaldehyde solution) were mixed; and to such mixture was added eighty-four hundredths (0.84) of a gram of sodium hydroxide dissolved in ten (10) c. c. of water. The mixture was heated at ninety-four degrees centigrade (94° C.) in a glass vessel under reflux. After three (3) hours, it set to a white opaque gel, which was then heated for one hour longer at the same temperature. The gel was then soaked in a strong hydrochloric acid solution until the whole body had become acid, after which it was pressure heat treated in a bomb for one hour, at a temperature of one hundred and twenty degrees centigrade (120° C.). The resultant resin dried to a light, hard and porous mass.

VIII

One (1) mole of phenol and two and forty-five hundredths (2.45) moles of formaldehyde (185 c. c. of the commercial formaldehyde solution) were mixed, to which mixture was added three (3) grams of sodium hydroxide dissolved in one hundred and thirty-seven (137) c. c. of water. The mixture was placed directly in a bomb and heated in an oil bath at one hundred and fifteen degrees centigrade (115° C.). The bomb temperature went to one hundred and thirty-eight degrees centigrate (138° C.) due to the heat of reaction; and a pressure of forty-four (44) pounds developed in the bomb. The total time of heating was about twenty-two (22) minutes, and ten (10) minutes beyond the point at which the peak temperature developed. This example illustrates the rapidity at which the reaction may be completed by initially conducting the reaction in a bomb.

Although in all the previous examples, we completed the reaction under pressure in a bomb for the purpose of expediting the reaction, and also to prevent loss of moisture from the resin while it is undergoing its final phases of the reaction, this need not be done if the reactable products are gently heated over a longer period. The described resins showed substantially no shrinkage on drying; and their final densities varied from four-tenths (0.4) to six-tenths (0.6), as was previously related. Although in most of the above examples we heated the reaction vehicle at a temperature of ninety-four degrees centigrade (94° C.), this was merely done because we have found that temperature suitable for obtaining the reaction without violence, and at a relatively fast rate. However, as was previously explained, such temperature may vary within relatively wide limits. Because of the light porous character of these resins, they provide an extremely efficient insulating material. Also when crushed, they provide a splendid carrier for ion exchange material because of their large surface area, and the high reactivity which they exhibit for amination, as is explained in our assignee's copending application by Gordon F. Mills and John L. Porter, filed Dec. 23, 1942, under Serial No. 469,940.

We claim:

1. The method of making a porous ion exchange carrier resin resulting from the reaction by application of heat in a reaction vehicle containing water, of phenol and formaldehyde in the presence of an alkali metal hydroxide condensing agent and in proportions varying from substantially one (1.0) mole of phenol to between substantially one and one-quarter (1.25) and four (4.0) moles of formaldehyde, which comprises controlling the character of the gel which forms by such reaction by employing a quantity of such alkali metal hydroxide which is sufficient to preclude separation of the reactable substances from the vehicle before the reaction mixture gels but which is insufficient to cause the gel which is formed by the reaction to be translucent or transparent, and thereafter drying the resin.

2. The method of making a porous ion exchange carrier resin resulting from the reaction by application of heat in a reaction vehicle containing water, of phenol and formaldehyde in the presence of an alkali metal hydroxide condensing agent and in proportions varying from substantially one (1.0) mole of phenol to between substantially one and one-quarter (1.25) and four (4.0) moles of formaldehyde, which comprises controlling the character of the gel which forms by such reaction by employing a quantity of such alkali metal hydroxide which is sufficient to preclude separation of the reactable substances from the vehicle before the reaction mixture gels but which is insufficient to cause the gel which is formed by the reaction to be translucent or transparent whereby the gel will contain the water substantially in the continuous phase, completing the reaction under pressure, and thereafter drying the resin.

3. The method of making an ion exchange carrier resin which is porous in the dry state and results from the reaction by application of heat in a liquid reaction vehicle essentially of an aqueous character and containing an alkali metal alkali condensing agent, of formaldehyde and a phenol having the two ortho and the para positions open and in proportions varying from substantially one (1.0) mole of the phenol to between substantially one and one-quarter (1.25) and four (4.0) moles of formaldehyde, which comprises causing the gel which forms by such reaction to contain the liquid reaction vehicle substantially in the continuous phase, by employing a quantity of the condensing agent which is sufficient to preclude separation of the reactable substances from the vehicle before the reaction mixture gels but which is insufficient to cause the gel which is formed by the reaction to be translucent or transparent, completing the reaction under pressure in a closed chamber, and thereafter drying the resin.

4. The method of making an ion exchange carrier resin which is porous in the dry state and which results from the reaction by application of heat in a water containing liquid reaction vehicle containing an alkali metal alkali condensing agent, of formaldehyde and a phenol having the two ortho and the para positions open and in proportions varying from substantially one (1.0) mole of the phenol to between substantially one and one-quarter (1.25) and four (4.0) moles of formaldehyde, which comprises causing the gel which forms by such reaction to contain the liquid reaction vehicle substantially in the continuous phase, by employing a quantity of the condensing agent which is sufficient to preclude separation of the reactable substances from the vehicle before the reaction mixture gels but which is insufficient to cause the gel which is formed by the reaction to be translucent or transparent, completing the reaction under pressure in a closed chamber, and removing liquid from the resultant resin by drying such resin.

5. The method of making an ion exchange carrier resin which is porous in the dry state and results from the reaction by application of heat in a water containing liquid reaction vehicle containing an alkali metal hydroxide condensing agent, of formaldehyde and a phenol having the two ortho and the para positions open and in proportions varying from substantially one (1.0) mole of the phenol to between substantially one and one-quarter (1.25) and four (4) moles of the formaldehyde, the phenol and the formaldehyde being substantially soluble in such vehicle, which comprises causing the gel which forms by such reaction to contain the liquid reaction vehicle substantially in the continuous phase, by employing a quantity of the condensing agent which is sufficient to preclude separation of the reactable substances from the vehicle before the reaction mixture gels but which is insufficient to cause the gel which is formed by the reaction to be translucent or transparent whereby the gel can be dried substantially without shrinkage and thereafter drying the resin.

6. The method of making an ion exchange carrier resin which is porous in the dry state comprising employing formaldehyde and a phenol having the two ortho and the para positions open, and in proportions varying from substantially one (1.0) mole of the phenol to between substantially one and one-quarter (1.25) and four (4) moles of the formaldehyde; condensing these substances by application of heat in a water containing liquid reaction vehicle in which they are substantially soluble and in the presence of an alkali metal alkali condensing agent in such vehicle; the quantity of the condensing agent with respect to the reactable substances in the vehicle and with respect to the quantity of such vehicle being sufficient to preclude separation of the reactable substances from the vehicle before the reaction mixture gels but insufficient to cause the gel which is formed by the reaction to be translucent or transparent, to thereby cause the gel to contain the liquid reaction vehicle substantially in the continuous phase whereby such gel can be dried substantially without shrinkage; and after formation of such gel utilizing it alone for formation of the final ion exchange carrier resin by completing the reaction under pressure in a closed chamber, and then drying the resultant product to remove the liquid therefrom without substantial shrinkage thereof.

7. The herein described porous ion exchange carrier resin produced in accordance with the method of claim 6.

GORDON F. MILLS.
ALEXANDER V. ALM.